United States Patent [19]

Kameyama et al.

[11] Patent Number: 5,086,381
[45] Date of Patent: Feb. 4, 1992

[54] DC-DC CONVERTER

[75] Inventors: Shigeru Kameyama; Koji Arakawa, both of Tsurugashima; Kazushi Watanabe, Nagaoka; Hitoshi Yoshioka, Kawasaki; Isami Norigoe, Inagi, all of Japan

[73] Assignees: Toko Kabushiki Kaisha; Nemic Lambda Kabushiki Kaisha, both of Tokyo; Yutaka Electric Mfg. Co., Ltd., Kanagawa; Densetsu Corp., Tokyo, all of Japan

[21] Appl. No.: 594,030

[22] Filed: Oct. 9, 1990

[30] Foreign Application Priority Data

Oct. 14, 1989 [JP] Japan ................. 1-266616

[51] Int. Cl.$^5$ ............................. H02M 3/335
[52] U.S. Cl. ......................... 363/16; 363/20; 363/91
[58] Field of Search ............ 363/16, 20, 21, 95, 363/97, 131, 90-91

[56] References Cited

U.S. PATENT DOCUMENTS

| 4,318,164 | 3/1982 | Onodera et al. | 363/21 |
| 4,399,376 | 8/1983 | Onodera et al. | 363/21 |
| 4,788,634 | 11/1988 | Schlecht et al. | 363/75 |
| 4,857,822 | 8/1989 | Tabisz et al. | 363/16 |
| 4,931,918 | 6/1990 | Inou et al. | 363/19 |
| 4,959,765 | 9/1990 | Weinberg | 363/20 |

Primary Examiner—Peter S. Wong
Attorney, Agent, or Firm—Stevens, Davis, Miller & Mosher

[57] ABSTRACT

A DC-DC converter includes a transformer and a switching element. The primary winding of the transformer and the switching element are connecting in series with a DC power source. A DC output is extracted via a rectifier circuit connected to a secondary winding of the transformer. A capacitor is connected in parallel to the switching element, and a saturable reactor is connected between the secondary winding of the transformer and the rectifier.

2 Claims, 3 Drawing Sheets

DC-DC CONVERTER

The present invention relates to the structure of a DC-DC converter designed to reduce losses.

BACKGROUND OF THE INVENTION

Description of the Prior Art

Recent developments in switching elements that can be used at high frequencies have resulted in an increase in the switching frequencies of DC-DC converters, and this in turn has led to expectations of reductions in the size of DC-DC converters because it should now be possible to construct smaller versions of the transformers, choke coils, and smoothing capacitors that take up so much room conventionally.

However, the switching losses that occur as current and voltage are superimposed whenever switching elements turn on and off increase as frequencies increase. This means that, regardless of how small these components and other circuit elements become, at present the heat dissipation countermeasures necessary for coping with the heat generated by such losses ensure that sizes cannot be reduced further.

A circuit diagram of a conventional forward DC-DC converter with one switching transistor is shown in FIG. 2, and the timings of voltage and current waveforms in this DC-DC converter are shown in FIG. 4.

In this DC-DC converter, a DC source $E_S$, a primary winding $L_1$ of a transformer $T_1$, and a transistor $Q_1$ that acts as a switching element form a series circuit, and a rectifying and smoothing circuit formed of a rectifier diode $D_1$, a choke coil $L_3$, a fly-wheel diode $D_2$, and a smoothing capacitor $C_1$ is connected to a secondary winding $L_2$ of the transformer $T_1$.

The transistor $Q_1$ receives a gate voltage from a control circuit that is not shown in the figure.

While the transistor $Q_1$ of the above DC-DC converter is on, a current flows through the primary winding $L_1$ on the input side of the transformer $T_1$, and a DC output is obtained at output terminals 1 and 1' from a voltage induced in the secondary winding $L_2$ on the output side, using the rectifying and smoothing circuit.

FIG. 4 shows the waveforms of the gate voltage $V_{G1}$ of the transistor $Q_1$, the drain-source voltage $V_{Q1}$ of the transistor $Q_1$, and the current $I_{Q1}$ flowing through the transistor $Q_1$ via the primary winding $L_1$, expressed against the same horizontal time axis. As can be seen from the figure, the drain-source voltage $V_{Q1}$ and the current $I_{Q1}$ are superimposed during a period between a time $t_1$ at which the transistor $Q_1$ turns on and a subsequent time $t_2$, and during a period between a time $t_3$ at which the transistor $Q_1$ turns off and a subsequent time $t_4$. This superimposition causes switching losses.

In the above conventional DC-DC converter, the switching losses that occur as described above increase as frequencies increase. In addition, if an insulated-gate field-effect transistor is used as the transistor $Q_1$ that acts as the switching element, a parasitic capacitor $C_2$ that is parasitic on such a transistor is in a charged condition at the time $t_1$ at which the transistor turns on, and both power is lost and noise is generated by the consequent shorting of the parasitic capacitor $C_2$.

SUMMARY OF THE INVENTION

Purpose of the Present Invention

The object of the present invention is to provide a DC-DC converter with one switching transistor designed to reduce losses.

Mode of Use of the Present Invention

The present invention relates to a DC-DC converter comprising a DC power source, a primary winding of a transformer, and a switching element connected in series, whereby a DC output is extracted via a rectifier and smoothing circuit connected to a secondary winding of the transformer while the switching element is on. The DC-DC converter is characterized in that a capacitor is connected in parallel to the switching element, and a saturable reactor is connected between the secondary winding of the transformer and the rectifier diode.

DESCRIPTION OF THE PREFERRED EMBODIMENT

An embodiment of the DC-DC converter of the present invention will be described below with reference to FIG. 1. Elements in FIG. 1 that are the same as those in FIG. 2 are denoted by the same reference notation.

Figure 1:
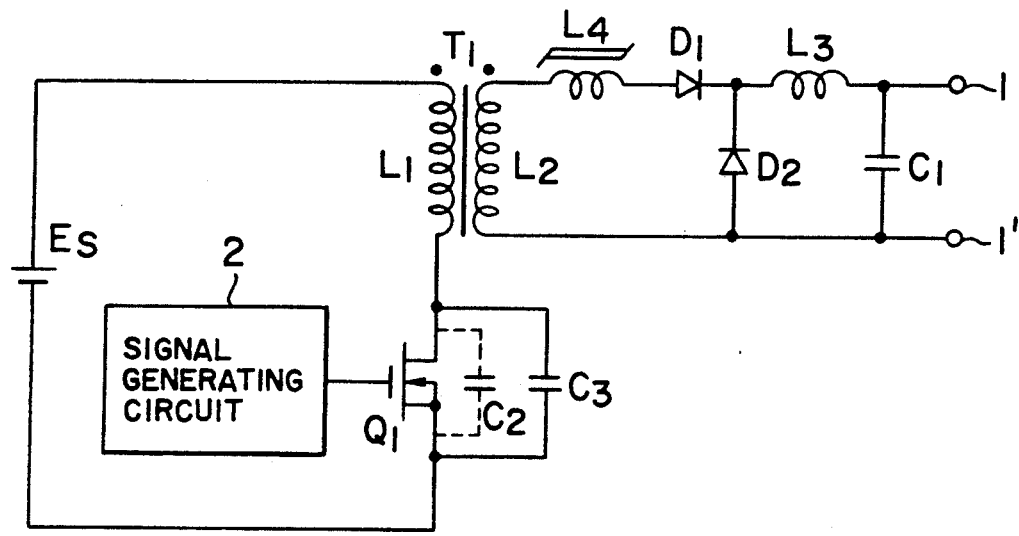
FIG. 1 is a circuit diagram of an embodiment of the DC-DC converter of the present invention.
Figure 2:
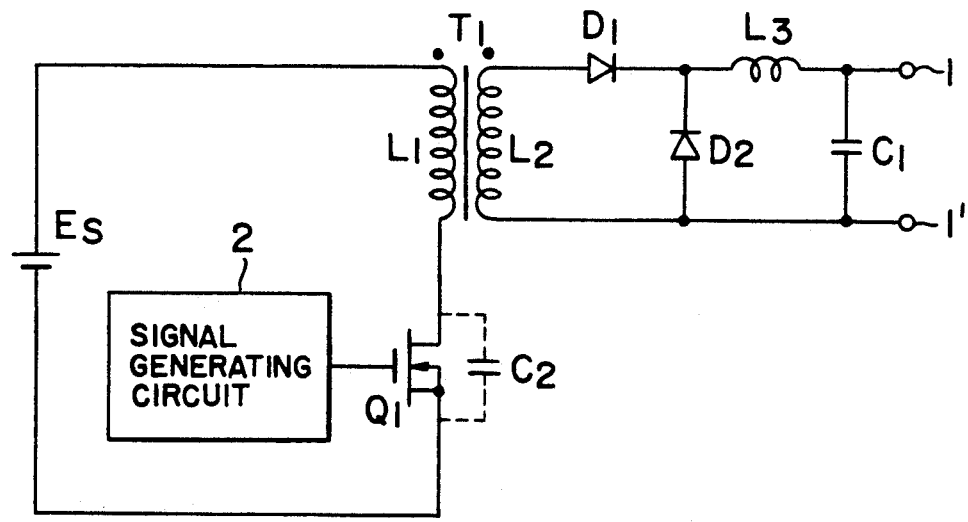
FIG. 2 is a circuit diagram of a conventional DC-DC converter.

The DC-DC converter with one switching transistor of FIG. 1 comprises a series circuit of a DC source $E_S$, a primary winding $L_1$ of a transformer $T_1$, and an insulated-gate field-effect transistor $Q_1$ that acts as a switching element, with a rectifying and smoothing circuit formed of a rectifier diode $D_1$, a choke coil $L_3$, a fly-wheel diode $D_2$, and a smoothing capacitor $C_1$ being connected to a secondary winding $L_2$ of the transformer $T_1$.

In addition, a capacitor $C_3$ is connected in parallel to the transistor $Q_1$, a saturable reactor $L_4$ is connected between the rectifier diode $D_1$ of the rectifying circuit and the secondary winding $L_2$, and electric power is transferred via the transformer $T_1$ while the transistor $Q_1$ is on, transistor $Q_1$ being applied a gate voltage from a signal generating circuit 2.

The operation of the DC-DC converter of the above construction will now be described with reference to the timing chart of FIG. 3.

Figure 3:
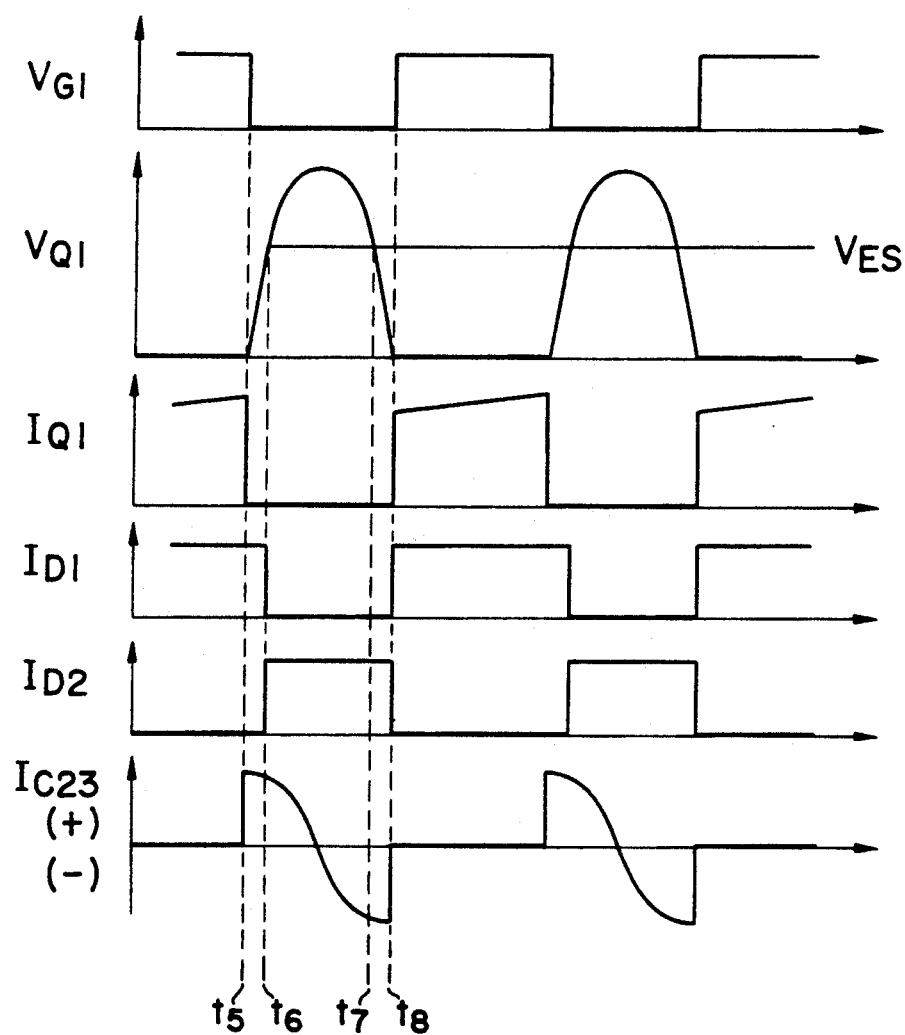
FIG. 3 is a timing chart of currents and voltages in the DC-DC converter of the present invention.
Figure 4:
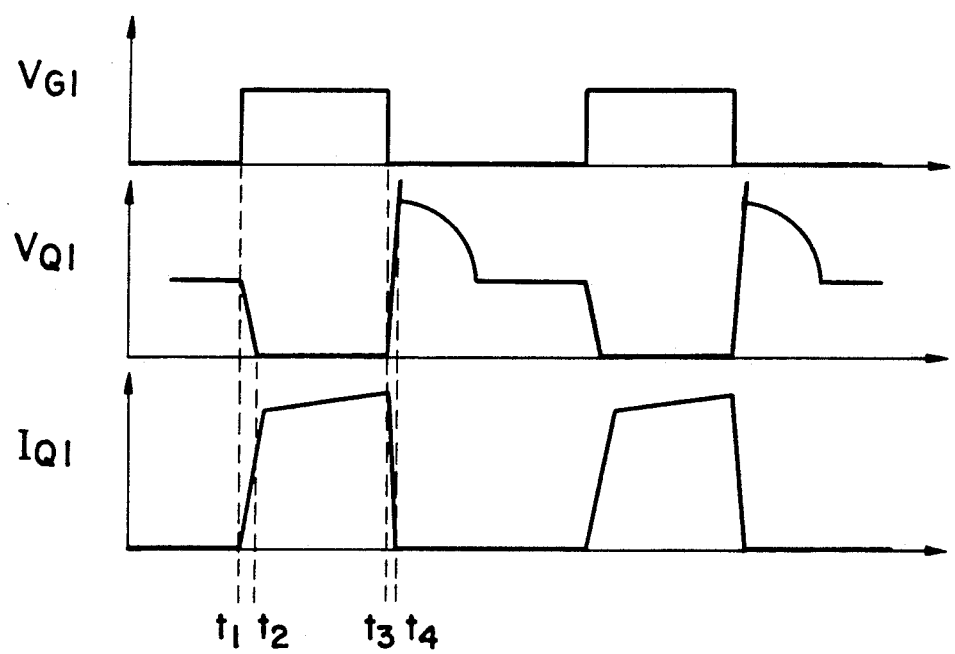
FIG. 4 is a timing chart of currents and voltages in the DC-DC converter of FIG. 2.

FIG. 3 shows the waveforms of a gate voltage $V_{G1}$ and a drain-source voltage $V_{Q1}$ of the transistor $Q_1$, a current $I_{Q1}$ flowing from the drain to the source of the transistor $Q_1$, a current $I_{D1}$ flowing through the rectifier diode $D_1$, a current $I_{D23}$ flowing through the fly-wheel diode $D_2$, and a current $I_{C23}$ that is the sum of currents flowing through the parasitic capacitor $C_2$ of the transistor $Q_1$ and the capacitor $C_3$, expressed against the same horizontal time axis.

First, at a time $t_5$ at which an on period ends, the gate voltage $V_{G1}$ of the transistor $Q_1$ becomes zero and the transistor $Q_1$ turns off, whereupon the current $I_{Q1}$ that was flowing from the primary winding $L_1$ of the transformer $T_1$ to the transistor $Q_1$ becomes zero. However, magnetizing current that was flowing through primary winding $L_1$ during on period tends to flow continuously, owing to the reaction of primary winding $L_1$. For this reason, this current flow through the parasitic capacitor $C_2$ of the transistor $Q_1$ and the capacitor $C_3$ connected parallel to the transistor $Q_1$, and is figured $I_{C23}$ (the sum of the currents flowing through the two capacitors) in FIG. 3. Therefore, the voltage between the two ends of the parasitic capacitor $C_2$ and the capacitor $C_3$ (in other words, the drain-source voltage $V_{Q1}$ of the transistor $Q_1$) rises smoothly while charging the parasitic capacitor $C_2$ and the capacitor $C_3$.

Therefore, no switching losses are generated by the drain-source voltage $V_{Q1}$ and the current $I_{Q1}$ being superimposed when the transistor $Q_1$ is turned off.

Subsequently, starting at a time $t_6$ at which the voltage $V_{Q1}$ exceeds the voltage $V_{ES}$ of the DC source $E_S$, a resonance phenomenon is generated in the series circuit consisting of the primary winding $L_1$, the combined capacitance of the parasitic capacitor $C_2$ and the capacitor $C_3$, and the DC source $E_S$.

This results in a voltage being applied to the primary winding $L_1$ of the transformer $T_1$ in the direction Opposite to that when the transistor $Q_1$ is on, after the time $t_6$ at which the voltage $V_{Q1}$ exceeds the voltage $V_{ES}$ of the DC source $E_S$. Therefore the voltage between the two ends of the secondary winding $L_2$ becomes negative at the polarity point side marked by the dot (·) in FIG. 1, the current $I_{D1}$ flowing through the rectifier diode $D_1$ disappears and the rectifier diode $D_1$ turns off, and therefore the output current flows as a current $I_{D2}$ through the diode $D_2$ and the secondary side of the transformer $T_1$ is opened in result.

The frequency f of this resonance is given by Equation (1), and the voltage between the ends of the capacitor $C_3$ (in other words, the drain-source voltage $V_{Q1}$ of the transistor $Q_1$) changes corresponding to a sine waveform of resonance.

$$f = \tfrac{1}{2}\pi \sqrt{L_1(C_2 + C_3)} \tag{1}$$

In Equation (1), $L_1$ is the inductance of the primary winding $L_1$, $C_2$ is the parasitic capacitance of the transistor $Q_1$, and $C_3$ is the capacitance of the capacitor $C_3$.

After the drain-source voltage $V_{Q1}$ reaches its peak, it falls smoothly but, immediately after a time $t_7$ at which it falls below the voltage $V_{ES}$ of the DC source $E_S$, a voltage is again applied to the primary winding $L_1$ in the same direction as that when the transistor $Q_1$ is on.

As a result, the polarity point side of the secondary winding $L_2$ marked by the dot (·) in FIG. 1 becomes positive, and, if the rectifier diode $D_1$ is connected directly to the secondary winding $L_2$, the rectifier diode $D_1$ becomes conductive at the same time as the diode $D_2$ which has been conductive up to this point, and the secondary winding $L_2$ of the transformer $T_1$ is electrically short. For this reason, there is no longer any inductance in the primary winding $L_1$ and hence there is no longer a resonant component, so the resonance does not continue.

However, in the Dc-DC converter of the present invention, the saturable reactor $L_4$ is connected between the secondary winding $L_2$ and the rectifier diode $D_1$, and the time at which the rectifier diode $D_1$ becomes conductive is delayed during the period is delayed during the period between the time when the polarity side of the secondary winding $L_2$ marked by the dot (·) in FIG. 1 became positive (the time $t_7$) and the time when saturable reactor $L_4$ is saturated. During this period, the secondary winding $L_2$ of the transformer $T_1$ is still electrically opened, so the resonance continues and, at a time $t_8$, the voltage between the ends of the capacitor $C_3$ (in other words, the drain-source voltage $V_{Q1}$) becomes zero. Of course, the period said above must be made longer than the period between the time $t_7$ and the time $t_8$.

The control circuit operates to turn on the transistor $Q_1$ at the time $t_8$ at which it detects that the voltage $V_{Q1}$ has become zero. Note that the circuit that detects the state of the voltage $V_{Q1}$ in this manner is not shown in FIG. 1.

Since the transistor $Q_1$ turns on after the voltage $V_{Q1}$ becomes zero, the voltage $V_{Q1}$ and the current $I_{Q1}$ are not superimposed when it turns on at time $t_8$, so no switching losses that would be caused by such superimposition occur.

In addition, before the transistor $Q_1$ turning on, resonance causes the drain-source voltage $V_{Q1}$ (in other words, the voltage between the ends of the parasitic capacitor $C_2$ and the capacitor $C_3$) to fall to zero, so no losses or noise caused by shorting of the parasitic capacitor $C_2$ are generated.

Note that in FIG. 3, the current $I_{C23}$ of the parasitic capacitor $C_2$ of the transistor $Q_1$ and the capacitor $C_3$ is denoted by (+) when it flows from the primary winding $L_1$ through the parasitic capacitor $C_2$ and the capacitor $C_3$, and by (−) when it flows in the opposite direction.

In the above structure, no switching losses are generated when the transistor turns either off or on, and no losses or short-circuit noise caused by the parasitic capacitor $C_2$ are generated.

It should be noted that the switching element could also be a bipolar transistor, and that the present invention can be applied to a wide variety of forward DC-DC converters, each having one switching transistor.

Effect of the Present Invention

As described above, in the DC-DC converter of the present invention, a capacitor is connected in parallel to the switching element, and a saturable reactor is connected between the secondary winding of the transformer and the rectifier diode.

In addition, when the switching element turns off, the magnetizing current flows through the capacitor connected in parallel to the switching element, ensuring that the voltage between the two ends of the switching element rises smoothly. When the switching element turns on, a resonance phenomenon continues, causing the voltage between the ends of the switching element to fall to zero.

In this way, there is no period during which voltage and current are superimposed, both when the switching element turns off and when it turns on, hence there are no switching losses.

What is claimed is:

1. A DC-DC converter comprising:
   a transformer having a primary winding and a secondary winding, said primary winding being adapted to be connected in series with a DC power source;

a rectifier and smoothing circuit;

a switching means, adapted to be connected in series with said DC power source, for connecting said rectifier and smoothing circuit to said secondary winding of said transformer during a time when said switching means is in an on-state;

a capacitor connected in parallel with said switching means; and a saturable reactor connected between said secondary winding of said transformer and said rectifier.

2. A DC-DC converter according to claim 1, wherein said switching element is an insulated-gate field-effect transistor.

* * * * *